(12) United States Patent
Iyer et al.

(10) Patent No.: US 8,687,562 B2
(45) Date of Patent: Apr. 1, 2014

(54) WIRELESS NETWORK ENHANCEMENTS

(75) Inventors: Suresh K. Iyer, Germantown, MD (US); Robert James Mitchell, Jr., Waterford, NY (US); Nick Andrew Van Stralen, Ballston Lake, NY (US); Orhan Cagri Imer, Boston, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 1650 days.

(21) Appl. No.: 11/776,716

(22) Filed: Jul. 12, 2007

(65) Prior Publication Data
US 2009/0016280 A1    Jan. 15, 2009

(51) Int. Cl.
*H04W 4/00* (2009.01)
*H04J 4/00* (2006.01)
*H04B 7/00* (2006.01)

(52) U.S. Cl.
USPC ........... 370/329; 370/436; 370/445; 370/345; 455/502

(58) Field of Classification Search
USPC .................... 370/445, 436; 455/502; 709/227
See application file for complete search history.

(56) References Cited

U.S. PATENT DOCUMENTS

| | | | |
|---|---|---|---|
| 4,677,617 A * | 6/1987 | O'Connor et al. | 370/478 |
| 6,791,994 B1 * | 9/2004 | Young et al. | 370/436 |
| 7,339,957 B2 * | 3/2008 | Hitt | 370/509 |
| 2003/0231607 A1 * | 12/2003 | Scanlon et al. | 370/338 |
| 2006/0104301 A1 * | 5/2006 | Beyer et al. | 370/445 |
| 2006/0239333 A1 * | 10/2006 | Albert et al. | 375/130 |
| 2006/0248197 A1 * | 11/2006 | Evans et al. | 709/227 |

OTHER PUBLICATIONS

Scott C. Evans et al.; "Energy Minimization in Wireless Sensor Networks Through an Adaptive Connectionless Scheduling Protocol (Adaptive CSP)"; GE Research, One Research Circle, Niskayuna, NY 12309; Appeared in Military Communications Conference, 2005. MILCOM 2005; Oct. 17-20, 2005.

* cited by examiner

*Primary Examiner* — Jinsong Hu
*Assistant Examiner* — William Nealon
(74) *Attorney, Agent, or Firm* — Ronald E. Prass, Jr.; Prass LLP

(57) ABSTRACT

Apparatus are provided, which include a wireless transmit interface and a wireless receive interface. A payload receive processor is provided to identify a receive overhead portion from received data received via the receive interface, and it is configured to retrieve payload data in relation to the receive overhead portion in accordance with a data structure protocol. A payload transmit processor is provided to define or modify a transmit overhead portion in transmit data to be transmitted via the transmit interface. The payload transmit processor is configured to position payload data in relation to the transmit overhead portion in accordance with a data structure protocol. A controller is provided, to determine a given wireless media location defined at least in part by the controller determining a given frequency band, from among plural frequency bands, for a given data transfer, via wireless media, between a given node and a separate node.

20 Claims, 12 Drawing Sheets

WIRELESS NETWORK ENHANCEMENTS

COPYRIGHT NOTICE

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

FIELD OF THE DISCLOSURE

The present disclosure is related to wireless networks, which include multiple stations that communicate with each other via wireless media, for example, separated by some distance, in changing environments, via radio frequencies.

BACKGROUND

Wireless networks, e.g., WLANs (wireless local area networks), include stations (nodes) that communicate with each other via wireless media, for example, radio frequency transmission. Some example standards for wireless networking include IEEE 802.11 and related standards (Wi-Fi and WiMAX standards), Bluetooth, HomeRF, Hiper-LAN/1 and 2, and OpenAir. Some wireless networks are ad hoc wireless networks, in which the stations communicate with each other via wireless media only, rather than through wired infrastructure access points, wired routers, or wired gateways. Wireless network technology allows multimedia data to be transmitted among separate devices (e.g., laptop and desktop computers, personal digital assistants, cellular telephones, radio and other communication devices, and so on), without a wired infrastructure or with less reliance on a wired infrastructure.

The rules for data transmitted among these wireless devices is controlled by the wireless network's media access protocol, sometimes also referred to as the network's media (or medium) access control protocol. The media access control protocol can affect data throughput and reliable data delivery, among the wireless devices (sometimes also referred to herein as "nodes"). The media access control protocol can also affect the extent to which the wireless devices consume power.

SUMMARY

Apparatus are provided, which include a wireless transmit interface and a wireless receive interface. A payload receive processor is provided to identify a receive overhead portion from received data received via the receive interface, and it is configured to retrieve payload data in relation to the receive overhead portion in accordance with a data structure protocol. A payload transmit processor is provided to define or modify a transmit overhead portion in transmit data to be transmitted via the transmit interface. The payload transmit processor is configured to position payload data in relation to the transmit overhead portion in accordance with a data structure protocol. A controller is provided, to determine a given wireless media location defined at least in part by the controller determining a given frequency band, from among plural frequency bands, for a given data transfer, via wireless media, between a given node and a separate node.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Figure 1:
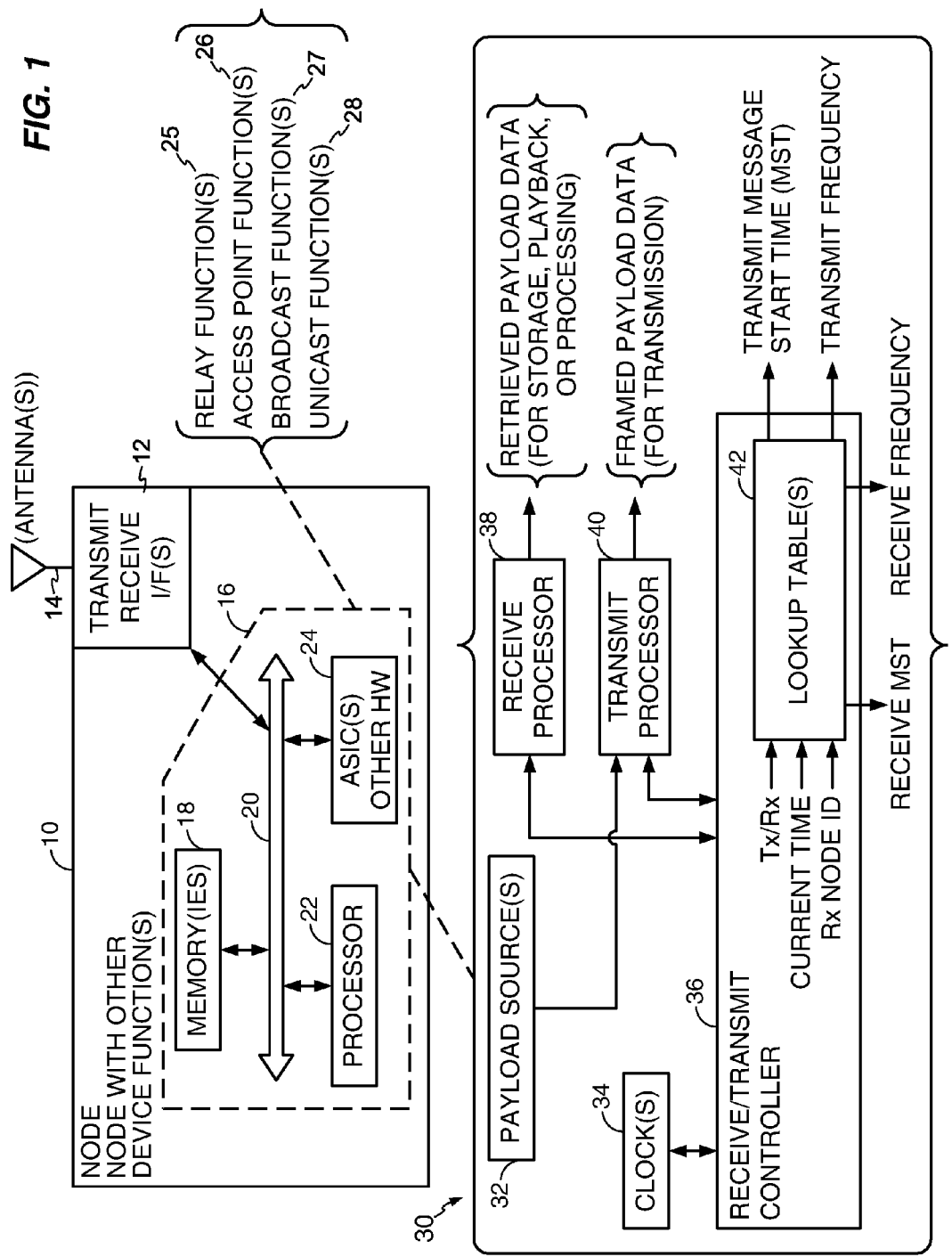
FIG. 1 is a block diagram of a wireless node in accordance with one embodiment of the present disclosure.

Embodiments of the present disclosure are directed to wireless networks that employ a random media access protocol, where the data is transmitted from a node to another node, via wireless media, without awaiting, for the transmission, a channel assignment to accommodate the demand of that data transmission. The data may be sent to one node (a unicast), to multiple nodes (a multicast), or to a whole set of nodes in the same network or subnet (a broadcast). The wireless network can be an ad hoc wireless network.

The wireless nodes can, in accordance with one example embodiment of this disclosure, communicate with each other via an adaptive connectionless scheduling protocol (CSP), which is a random access media protocol, e.g., described in an article by Evans et al., entitled "Energy Minimization in Wireless Sensor Networks through an Adaptive Connectionless Scheduling Protocol (Adaptive CSP)", Proceedings MILCOM2005, Atlantic City, N.J., October 2005. This protocol implements scheduling based upon a clock and some discriminating node feature, and has been suggested to minimize energy costs in wireless sensor networks. The protocol employs an adaptive CSP (connectionless scheduling protocol) pseudorandom scheduling paradigm, which can accommodate data rate requirements over a wide range of traffic scenarios, and which can adapt to load and latency requirements in various environments.

In wireless networks, one node communicates with another node (or a set of nodes within range or within the same net or subnet) via a "wireless media location" (e.g., a channel, which, per embodiments herein, may mean a separate (virtual or physical) "path" through which signals can flow). A given wireless media location may, for example, be a media resource such as a frequency band, a particular time (e.g., a message start time), or a position within a protocol data unit (e.g., a particular segment of a frame), where one media resource (e.g., one frequency band) is distinct from another (e.g., a different, non-overlapping frequency band). A given wireless media location may also be a multiplexed portion of a media resource. For example, distinct media locations (e.g., channels) may coexist within a common media resource (e.g., a common frequency band, a common time slot, a common frame, a common packet, and so on). Examples of techniques for multiplexing within common media resources include time division multiplexing, code division multiplexing, and frequency division multiplexing.

With a demand assigned media access protocol, a given set of nodes will transmit data among themselves in accordance with a wireless media location assignment. Before a transmission can occur, the nodes acquire an "assignment" of a wireless media location. With a random access media access protocol, the data transmission occurs without first awaiting a wireless media location assignment.

Per one embodiment of the present disclosure, a random access approach is used to determine how nodes are to transmit or receive data. For example, a source node (a transmitter)

may make a unicast transmission at a particular wireless media location at which it knows a target node (receiver) will receive the transmission. The source node may be configured to know, in accordance with a pseudorandom schedule, the wireless media locations at which various target nodes are to receive data at any given time. Accordingly, when the source node wishes to send data to a given target node, the source node determines the pseudorandomly assigned wireless media location for that target node, "tunes" its transmit wireless media location accordingly, and then initiates the message exchange with the target node.

A given node generally has a data source, which may include a data processor, a data capture mechanism (for example, a graphical user interface, a keyboard, and a sensor device), or a voice (or other media) capture mechanism (e.g., a microphone and voice storage). In addition, the node may include, as a payload source, a mechanism for relaying payload data (data and/or voice from some other source such as, e.g., a connected computer).

The node may further include a wireless transmit interface and a wireless receive interface. A payload receive processor and a payload transmit processor may each be provided. The payload receive processor identifies a receive overhead portion from received data received via the receive interface, and it retrieves payload data in relation to the receive overhead portion in accordance with a data structure protocol. The payload transmit processor defines or modifies a transmit overhead portion in transmit data, to be transmitted via the transmit interface, and it positions payload data in relation to the transmit overhead portion in accordance with a data structure protocol. The data structure protocol may be a framed-base data structure protocol.

The node may include a controller that unilaterally determines a given wireless media location, including a given frequency band, from among plural frequency bands, for transferring information between the given node and a target node. The type of transfer may be, e.g., a unicast transfer or a broadcast transfer. The wireless media location may include a transmission time (for example, a message start time in relation to a certain reference time, without regard to the duration of the transmission), and/or a frame position and/or a slot (e.g., time or frequency) of a division multiplexed signal. The unilateral determination of a given wireless media location may be in accordance with a pseudorandom sequence assigned in accordance with a unique identifier of the given neighbor node. The pseudorandom sequence can be determined by the current node (i.e., by the controller forming part of the current node), by providing the current node with an algorithm that generates a pseudorandom output, in accordance with a pseudorandom numbered generator (PRNG) algorithm.

In order to determine precisely when data can be exchanged with a given node, using a message start time approach, a clock mechanism may be provided in the node, in order to ascertain a reference time common to all nodes across the network. For example, time synchronization may be achieved among the nodes in the network by employing a common time beacon, e.g., transmitted by a network node, or provided by a separate infrastructure like GPS or an onboard clock, such as an atomic clock.

Referring now to the drawings in greater detail, FIG. 1 illustrates one embodiment of a node 10, or a node 10 with other device functions. The illustrated wireless node 10 may, for example, be a radio device, a wireless computer, a personal digital assistant, or any other wireless networked device. Among the elements provided as part of node 10, one or more antennas 14 is provided, and one or more interfaces 12 is provided for facilitating the wireless transmission and reception of data. The illustrated node 10 further includes circuitry 16, which includes one or more memories 18, a bus 20, a processor 22 (for example, a microprocessor or a controller) and other hardware 24 (which may include, for example, application specific integrated circuits (ASICs)). Parts of circuitry 16 may individually, or in combination with other parts, perform various functions related to wireless networks, including one or more relay functions 25, one or more access point functions 26, one or more broadcast functions 27, and one or more unicast functions 28. For example, node 10 may be provided with a mechanism for allowing node 10 to serve as a relay in a wireless network, and/or as an access point in a wireless network (if node 10 is connected to a wired infrastructure). Broadcast and unicast functions 27 and 28 may be further provided in node 10, where node 10 can transmit data to other nodes in its wireless network in a broadcast mode, in which a plural set or all of the neighbor nodes in the network are sent data from the node, or a unicast mode in which only one neighbor node is sent data.

Circuitry 16 in node 10 forms, with hardware circuitry, with application specific integrated circuitry, or with a combination of hardware, ASICs, software, and/or data, a number of media access components 30.

The illustrated media access components 30 include one or more payload sources 32, one or more clocks 34, and a receive/transmit controller 36. The illustrated media access components 30 further include a receive processor 38 and a transmit processor 40. The illustrated receive/transmit controller 36 further includes one or more lookup tables 42. Payload source or sources 32 may include, for example, a data processing component of node 10, a data capture component (e.g., a keyboard and a graphical user interface), and/or voice (and/or media) capture and storage mechanisms. In addition, payload source(s) 32 may include a mechanism for relaying payload data sent from some other source. Clock(s) 34 produce(s) clock signals, including a reference time signal synchronized with all nodes that are part of the same wireless network.

Receive processor 38 is configured to identify a receive overhead portion from received data, received via interface 12, and it is configured to retrieve payload data in relation to the receive overhead portion in accordance with a data structure protocol. In the illustrated embodiment, the data structure protocol is a frame-based protocol. A more specific example of a framed-base data structure protocol that may be employed is further described below.

Transmit processor 40 is configured to define or modify a transmit overhead portion in transmit data to be transmitted via interface 12, and is configured to position payload data in relation to the transmit overhead portion in accordance with the data structure protocol.

Per an alternate embodiment, transmitter 38 may simply transmit payload data at a wireless media location without adding any overhead information.

More particularly, for example, receive processor 38 may output retrieved payload data (for storage, playback, or processing). Transmit processor 40 may output, for example, framed payload data (for transmission).

Receive/transmit controller 36 is configured to unilaterally determine a given wireless media location for receiving data (when in reception mode) or for transmitting data (when in a transmit mode). As further described below, in one embodiment, the given wireless media location may be defined in terms of both a transmission time (for example, a message start time) of a given unicast message and a frequency band from among a plural set of frequency bands.

Receive/transmit controller 36 in one embodiment, accordingly, determines (for a current given data transmission or reception) a given message time and a given frequency band, from among plural frequency bands available for transmitting data among nodes in the network. The transfer of data with the given neighbor node may be a unicast or broadcast transmission between the current node and the other node.

The unilateral determination of the given wireless media location, in the example illustrated embodiment, is made pseudorandomly. When the node is receiving, it's determined as a function of the transmission time. When the node is transmitting, it's determined as a function of both the transmit time and the ID of the receiver node.

One or more lookup tables 42 may be provided, which allow for a lookup table determination of a particular pseudorandom output. Per an alternative embodiment, rather than provide one or more lookup tables, or in addition thereto, a mathematical algorithm may be employed to generate a pseudorandom output, e.g., using the ID of the transmitter or receiver as the seed to the algorithm. In the illustrated embodiment, when the node is in a transmit mode, lookup table(s) 42 output a message start time (MST) for transmission, which is the message start time expected by the target node. In addition, lookup table(s) 42 output a frequency channel at which the target node will be tuned to receive the data. One frequency channel may be assigned to the target node for unicast transmissions thereto, while a different frequency channel may be assigned for the same target node for broadcast transmissions.

In the illustrated embodiment, when the node is in a receive mode, lookup table(s) 42 output a receive message start time (MST) (or a range of MSTs) during which it will receive data transfers. In addition, lookup table(s) 42 output a receive frequency channel at which the node will be tuned for data reception. There may be two receive frequency channels, i.e., one frequency channel for a unicast transmission, and a different frequency channel for a broadcast transmission. In addition, within a given time frame, one time period may be allocated for broadcasts while a different non-overlapping time frame is allocated for unicasts.

Figure 2:
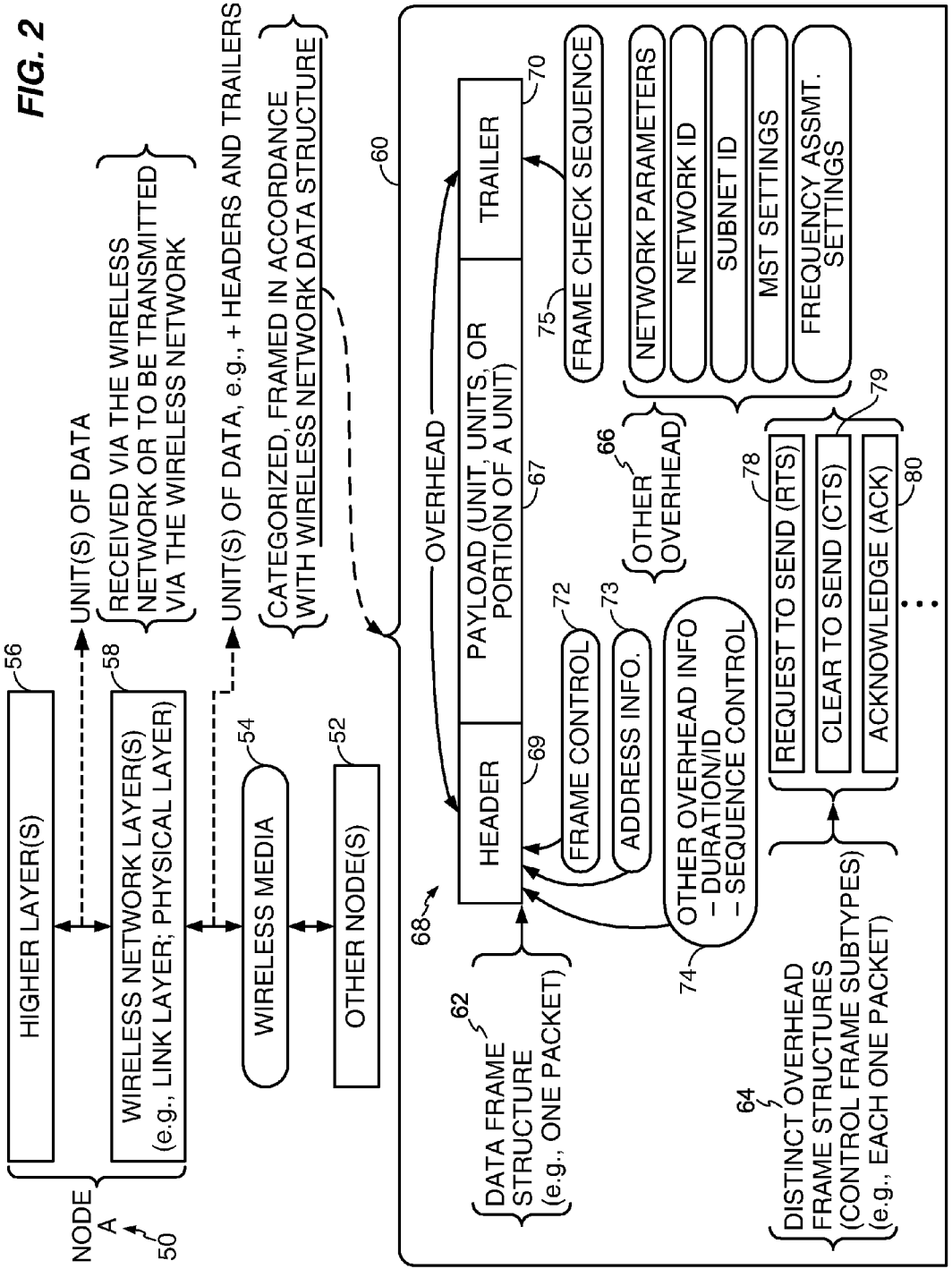
FIG. 2 is a schematic diagram of a wireless network, including a node connected by wireless media to other nodes.

FIG. 2 is a schematic diagram illustrating the manner in which higher layers of a given node communicate with the wireless network layer and lower layers of the same node, resulting in a different type of data structure for data in the higher layers than for the data as it is being transmitted over the wireless media. The illustrated system includes a first node (node A) 50, and one or more other nodes 52, which communicate with each other via wireless media 54. Node A 50 includes one or more higher layers 56, and one or more wireless network and lower layers 58. The illustrated wireless network layer(s) 58 may include the link layer of a WLAN (wireless local area network) network, in accordance with the OSI reference model. A link layer may be provided that responds to service requests from a network layer, and that issues service requests to a physical layer, which directly interfaces with the wireless media.

Wireless network layers(s) 58 receives one or more units of data ("service data units") via wireless media 54, and provides the data portion of those received units of data to higher layer(s) 56, which may hand off the data to other applications in the node. Wireless network layer(s) 58 also take such units of data from higher layer(s) 56 and transmits those units of data via the wireless network, and therefore via wireless media 54, to other nodes 52.

When the units of data are retrieved from wireless media 54, or transmitted over wireless media 54, the units of data are put in a particular wireless network data structure. For example, the units of data may be encapsulated with header and trailer information. More specifically, the data may be put in the form of a frame structure.

FIG. 2 illustrates an example frame structure 60 which may be employed.

The illustrated example frame structure 60 includes a data frame structure 62, a set of distinct overhead frame structures 64, and other overhead information 66.

A given frame, for example, a larger data frame 62, or a distinct overhead frame 64, may be transmitted between nodes, for example, as follows.

The illustrated data frame structure 62 may, for example, be a single packet in a connectionless communications protocol. The illustrated data frame structure 62 includes a protocol data unit 68, which, in this embodiment, is a frame. The illustrated frame 68 includes a payload portion 67, preceded by a header 69, and followed by a trailer 70. The payload 67 includes one, a plurality, or a portion of service data units.

The header 69 may include, for example, a frame control 72, address information 73, and other overhead information 74 (e.g., duration/ID, and sequence control). The illustrated trailer 70 may include, for example, a frame check sequence 75.

The illustrated frame structure 60 may also use a number of distinct overhead frame structures (control frame subtypes), and each of those may be in a form of a single packet, e.g., in the case of a connectionless wireless communications protocol. As illustrated, those frame structures 64 may include, for example, a request to send (RTS) frame 78, a clear to send (CTS) frame 79, and an acknowledge (ACK) frame 80.

Other overhead information 66 may be communicated within the frame structure 60 and may be included within one or more overhead portions of the data frame structure 62 and the other overhead frame structures 64. That other overhead information 66 may include, for example, network parameters, network identification information, subnet identification information, message start time (MST) settings, and frequency assignment settings.

The MST settings may, for example, include data which allows for communication among nodes regarding the manner in which message start times are associated with respective nodes, and the frequency assignment settings may include information which allows for communication among nodes regarding the manner in which frequency bands are, for certain types of data transmission, assigned to nodes within a network (or a subnet).

FIGS. 3-13 are flow diagrams of processes per one example embodiment of a node.

Figures 3, 4:
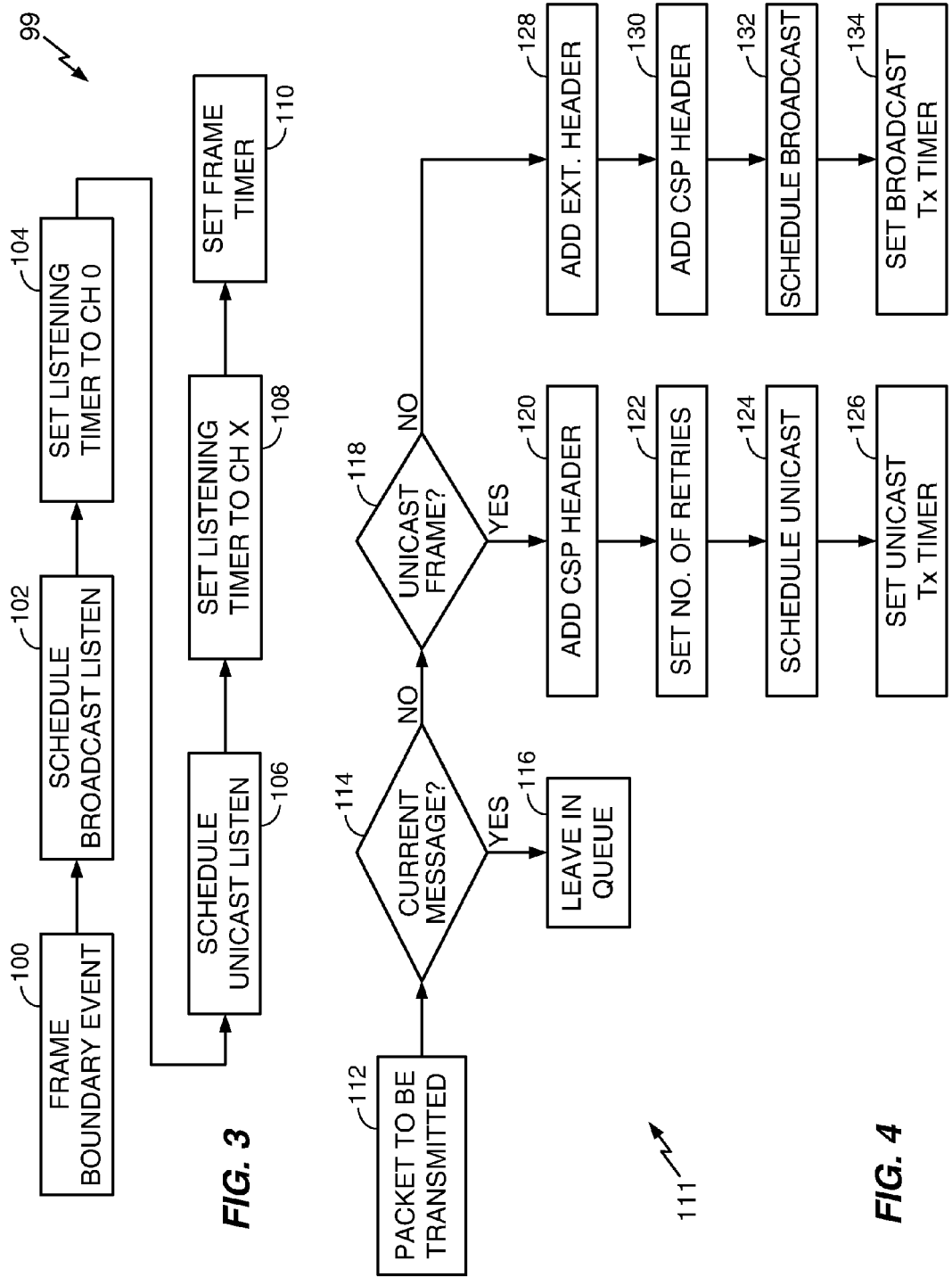
FIGS. 3-13 illustrate flow diagrams of processes performed by a received/transmit controller as shown is FIG. 1.

FIG. 3 illustrates, in a flow diagram, a process by which a given node receives data. In an initial act 100, the node determines that a frame boundary event has occurred. In a next act 102, a broadcast listen is scheduled for the given node. Then, in act 104, the listening timer of the given node is set to the frequency channel over which broadcasts are to be made for the network or subnet pertaining to the given node. In act 106, a unicast listen is scheduled for the given node. The listening timer is then set in act 108, to channel x, which is the frequency channel corresponding to unicast messages for that given node within the pertinent network or subnet. In act 110, the frame timer is set.

FIG. 4 is a flow diagram illustrating a transmit process for a given node. In an act 112, a packet to be transmitted is encountered, for example, from the higher layers being serviced by the wireless network layer(s). In a next act 114, a determination is made as to whether the node is currently processing another message or packet. If the node is currently processing another message, the packet is left in queue, per act 116. If the node is not currently processing a message, the process proceeds to act 118, where a determination is made as to whether the packet is for a unicast frame.

In act 112, a packet is also deemed to be transmitted if upon checking the queue, the process determines that the queue is not empty, in which case the process proceeds directly from act 112 to act 118, after eliminating the packet from the queue.

If a determination is made in act 118 that the packet to be transmitted is for a unicast frame, the process proceeds to act 120, where a CSP (connectionless scheduling protocol) header is added to the unicast frame. Then, in act 122, a number of retries to be attempted is set. The number of retries may be set at zero. In act 124, the unicast transmission is scheduled. In act 126, the unicast transmit timer is set.

If the packet is not for a unicast frame, as determined at act 118, the process proceeds to act 128, where a media access control extended header is added. The extended header may include a source MAC (media access control) address, a source IP address, and a source address. In act 130, the CSP header is added. In the illustrated embodiment, the headers added here do not affect the operation of the subsequent scheduler.

The CSP header may include, for example, a source address, a destination address, a packet type, a packet size, and a sequence number.

In act 132, the broadcast is scheduled, and then in act 134, the broadcast transmit timer is set.

When a broadcast listen is scheduled in act 102 (in FIG. 2), receive/transmit controller 36 of media access components 30 (shown in FIG. 1) schedules a broadcast listen process, whereby data broadcasted to the given node will be listened to upon the occurrence of a message start time (MST) for that corresponding given broadcast. When the listening timer is set to the channel for the broadcast listen, in act 104, a listening timer (provided as part of the receive/transmit controller 36) will be set to cause listening to occur at the frequency of that channel.

Similarly, unicast listen scheduling, in act 106, and the setting of a listening timer to a particular channel in act 108, are also handled by receive/transmit controller 36.

In act 124 (in FIG. 4), the scheduling of a unicast transmission involves receive/transmit controller 36 scheduling the particular message start time for that transmission. The scheduling of a broadcast transmission in act 132 also involves receive/transmit controller 36 scheduling a message start time for that transmission. The setting of the transmit timers, in the case of a unicast message or a broadcast message (in respective acts 126 and 134), involves the use of a transmit timer in receive/transmit controller 36 to make sure that the unicast or broadcast transmission occurs within the appropriate portion of the frame.

In this regard, the frame structure may include a time frame or segment that is for broadcasts and another segment for unicasts. The nodes can, accordingly, schedule exchanges of information during broadcasts and during unicasts, to make sure that each of these occurs within its appropriate segment within the frame structure.

When a broadcast event is scheduled, receive/transmit controller 36 may be provided with a mechanism for determining if it is busy, for example, receiving a broadcast from another node, performing a relay operation, or for some other reason. If the receive/transmit controller 36 is busy, a broadcast can be scheduled for a later time, corresponding to a message start time during the broadcast segment in the frame structure. The broadcast transmit timer can accordingly be set, to cause the broadcast to occur at that scheduled time.

Unicast events can be scheduled in a similar manner. When a unicast event is to be scheduled, the receive/transmit controller 36 can make a determination as to whether it is busy performing some other process, for example, receiving a unicast from another node, performing a relay of data, or some other operation. If the receive/transmit controller 36 is not busy, the unicast event can be immediately be scheduled, if the target node's frequency channel is available, by interacting with the physical layer of the process. If the unicast event cannot be immediately scheduled, it can be scheduled for a later time, and the unicast transmit timer can be set accordingly.

Figure 5:
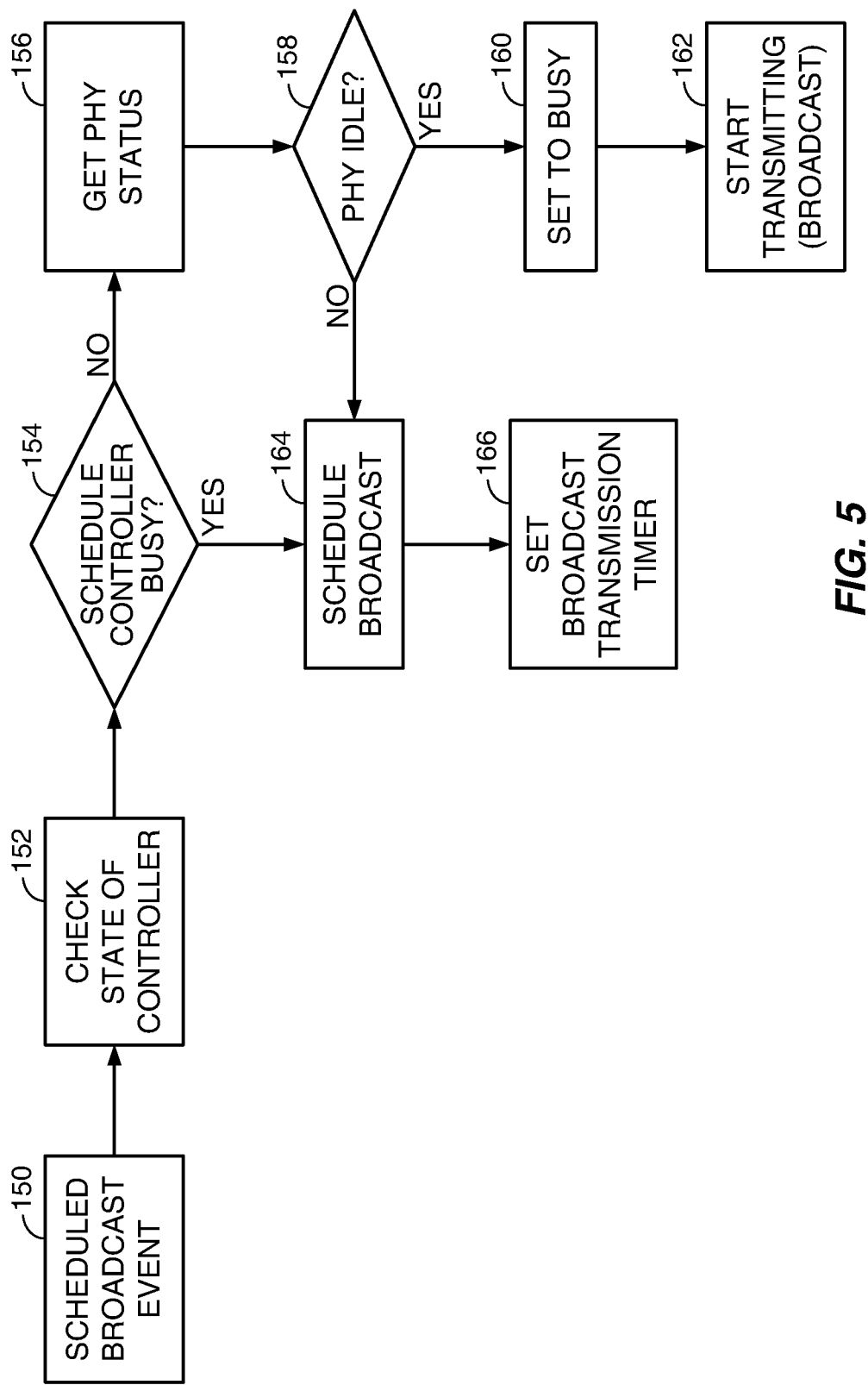

FIG. 5 is a flow diagram illustrating a process performed by a receive/transmit controller 36, when a broadcast event has occurred. A broadcast event occurs when the broadcast timer 134 expires. In act 150, a broadcast event has occurred. In act 152, the state of the schedule controller (provided as part of controller 36) is checked. In act 154, a determination is made as to whether the schedule controller is busy. If the controller is not busy, the process proceeds to act 156, where the controller obtains the status of the physical layer. If the physical layer (PHY) is idle as determined at act 158, the process proceeds to act 160, where the schedule controller is set to busy. At act 162, the broadcast transmission is commenced.

If a determination is made at act 154 that the controller is busy, the process proceeds to act 164, at which point the broadcast is scheduled. At act 166, the broadcast transmission timer is set in accordance with a next available message start time for the broadcast.

Figure 6:
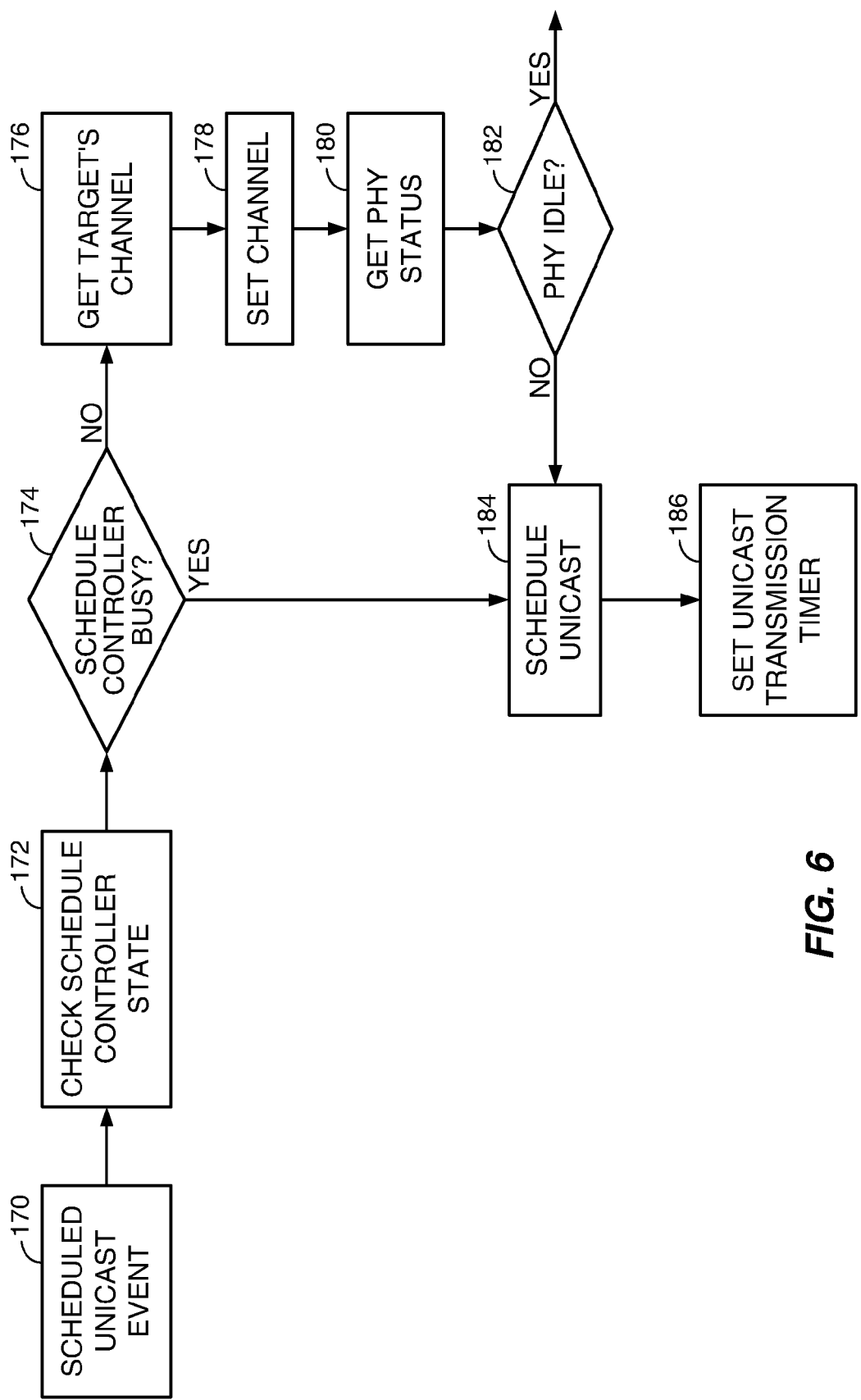
Figure 7:
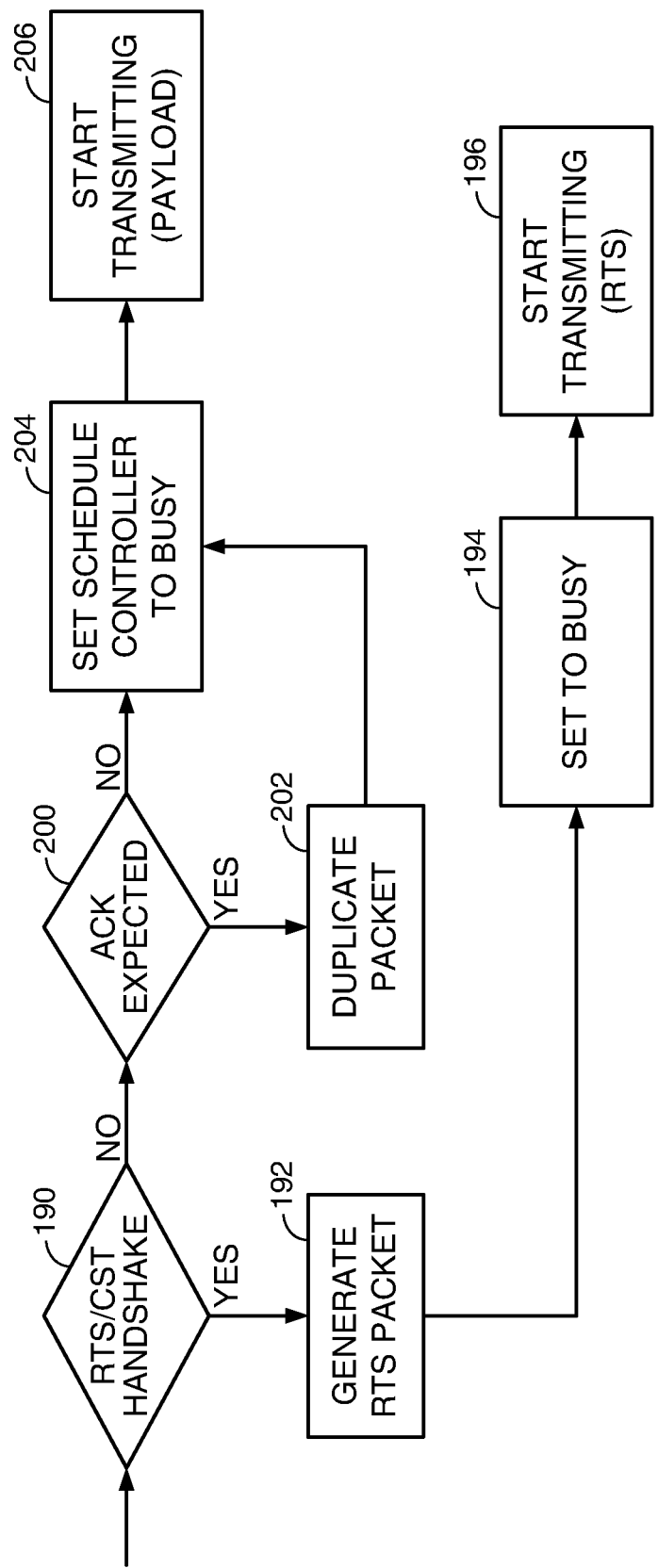

FIGS. 6 and 7 collectively illustrate a flow diagram of a process for scheduling a unicast event. In an act 170, a unicast event has occurred. A unicast event occurs when the unicast transmission timer 126 expires. In act 172, the state of the schedule controller is checked. At act 174, a determination is made as to whether the schedule controller is busy. If the schedule controller is not busy, the process proceeds to act 176, at which point receive/transmit controller 36 interacts with lookup table(s) 42 to determine the transmit frequency (i.e., the frequency channel of the target node). At act 178, the channel for transmit is set. At act 180, the status of the physical layer (PHY) is obtained. In act 182, a determination is made as to whether the physical layer is idle.

If a determination is made at act 174 that the schedule controller is busy, the process proceeds to act 184, where the unicast is scheduled. The unicast transmission timer is then set at act 186, in accordance with the schedule.

After determining that the physical layer is idle at act 182, the process proceeds to act 190 (shown in FIG. 7), at which point a determination is made as to whether an RTS/CTS (ready to send/clear to send) handshake is to be performed. The nodes within the wireless network may have settings so that they may be configured to perform RTS/CTS handshakes and to also perform an acknowledgement process.

If, per the determination at act 190, an RTS/CTS handshake is to be performed, the process proceeds to act 192, at which point an RTS packet is generated. The process then proceeds to act 194, at which point the schedule controller is set to be busy. In a next act 196, the transmission of the RTS packet is commenced.

If a determination is made at act 190 that a RTS/CTS handshake is not to occur, the process proceeds from act 190 to act 200, at which point a determination is made as to whether an acknowledge (ACK) process is to be expected. If an acknowledge is to be expected from the target node, the process proceeds to act 202, at which point a duplicate packet is prepared for transmission, and the process proceeds to act 204. If an acknowledge is not expected, the process proceeds from 200 to act 204.

At act 204, the schedule controller is set to busy, and thereafter, at act 206, the transmission of the protocol data unit (including payload) is commenced.

Figure 8:
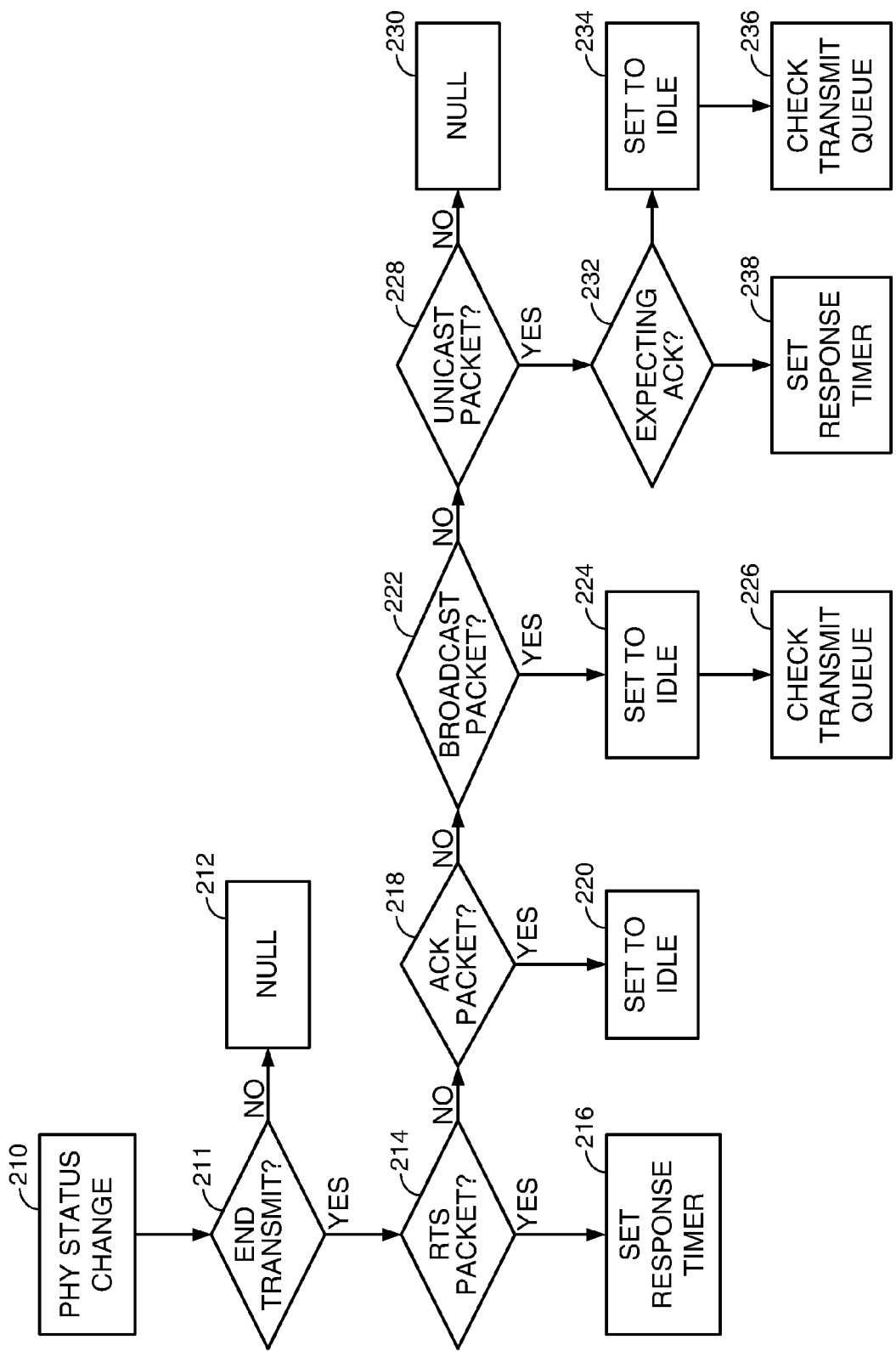

FIG. 8 is a flow diagram of a process performed when a status change occurs in the physical layer (PHY). A physical layer status change signal is per one embodiment, the interaction between the physical layer and the media access layer. The physical layer may be provided with a way (e.g., with a physical layer status change signal, or in another way) of informing the media access layer that a packet has been transmitted. A status change occurrence is indicated at act 210, at which point the process proceeds to act 211. At act 211, a determination is made as to whether the status change was an end of transmission status change (i.e., a packet has been transmitted). If the status change was not an end of transmission, the process proceeds to act 212, a null.

If the status change is an end of transmission, the process proceeds to act 214. At act 214, a determination is made as to whether an RTS packet was just sent by the current node, which was the cause of the status change at act 210. If this is case, the process proceeds to act 216, at which point the current node will set a response timer to await a CTS response.

If the current physical status change is an ACK packet that was sent by the current node, as determined at act 218, that means that the payload was successfully received by the current node, and, therefore, the process proceeds to act 220, at which point the schedule controller is set to idle. If the physical status change was not due to an ACK packet, the process proceeds to act 222, at which point a determination is made as to whether the physical status change is due to the current node sending a broadcast packet. If it is due to sending a broadcast packet, the process proceeds to act 224, at which point the schedule controller is set to idle, and, in a next act 226, the transmit queue will be checked to determine if another packet is to be transmitted from the current node to a neighbor node. This is where queued packets put into queue 116 get scheduled.

If the physical status change is not due to a broadcast packet, as determined at act 222, the process proceeds to act 228. At act 228, a determination is made as to whether the physical status change is due to the current node sending a unicast packet. If the current node physical layer status change is not because the current node has sent a unicast packet, determined at act 228, the process proceeds to act 230, where no action is taken.

If a unicast transmission has occurred, the process proceeds to act 232, where a determination is made as to whether an ACK (acknowledgement) is to be expected. If an acknowledgement is not to be expected, the process proceeds to act 234, at which point the schedule controller is set to idle, and the process thereafter, in act 236, checks the transmit queue.

If a determination is made at act 232 that an ACK is to be expected, the process proceeds to act 238, where a response timer is set.

Figure 9:
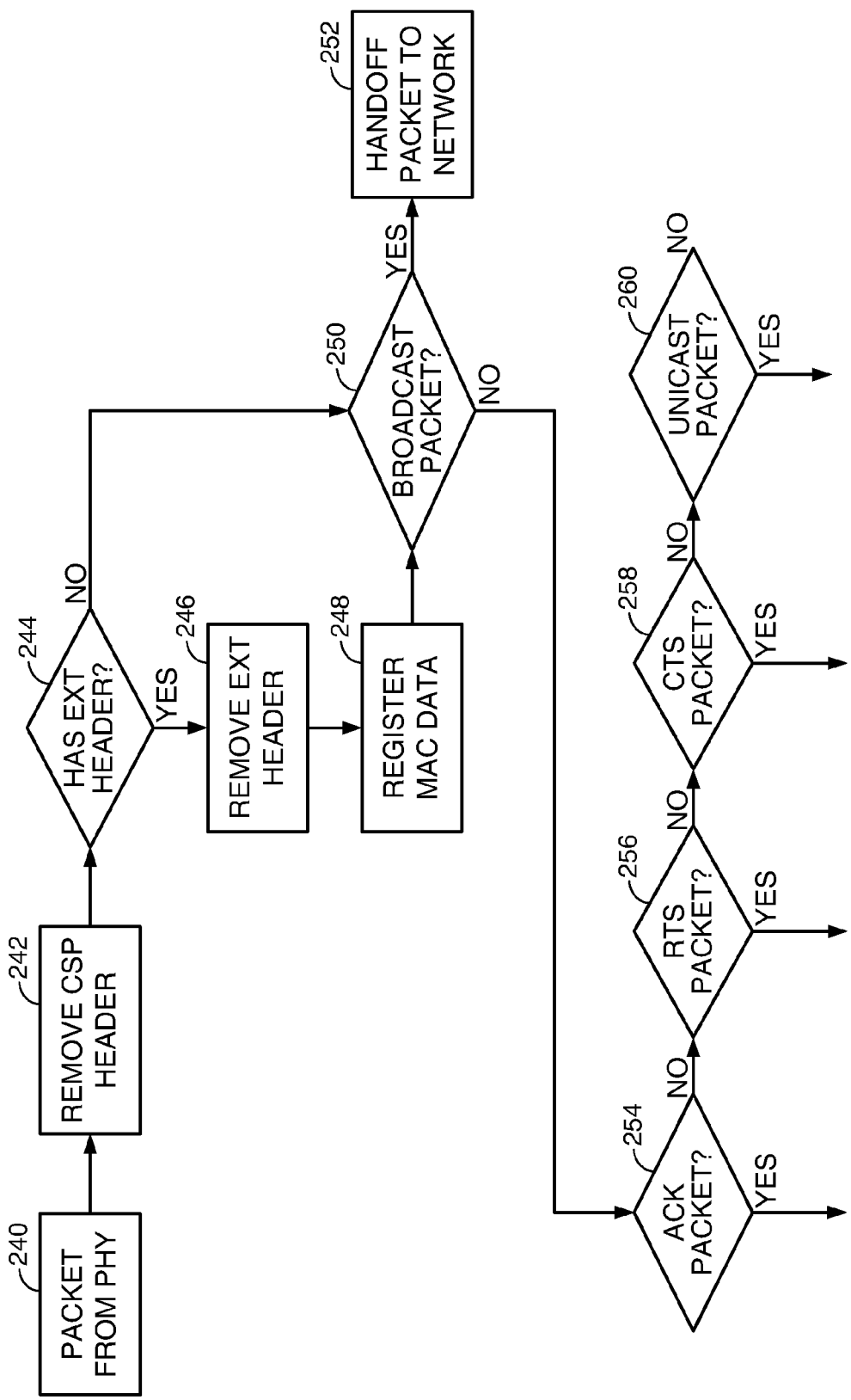

FIG. 9 is a flow diagram illustrating a process performed when a packet is received from the physical layer, in the current node. At act 240, a packet has been received from the physical layer. In a next act 242, a CSP (connection scheduling protocol) header is removed from the packet. In a next act 244, a determination is made as to whether the packet has an extended header. If packet has an extended header, the process proceeds to act 246, at which point the extended header is removed. Thereafter, at act 248, the MAC (media access control) data is registered.

The process proceeds to act 250, from act 244 when there was no extended header, or directly from act 248, when there was an extended header. At act 250, a determination is made as to whether the packet being received is a broadcast packet. If the packet being received is a broadcast packet, the process proceeds to act 252, where the packet is handed off to the higher layers in the current node, and also to other nodes in the network, as appropriate.

If the current packet is not a broadcast packet, as determined at act 250, the process proceeds to act 254. At act 254, a determination is made as to whether the current received packet is an ACK packet. If not, the process proceeds to act 256, to determine if the current packet is an RTS packet. If not, the process proceeds to act 258, to determine if the current packet is a CTS packet. If not, the process proceeds to act 260, to determine if the current packet is a unicast packet.

Figure 10:
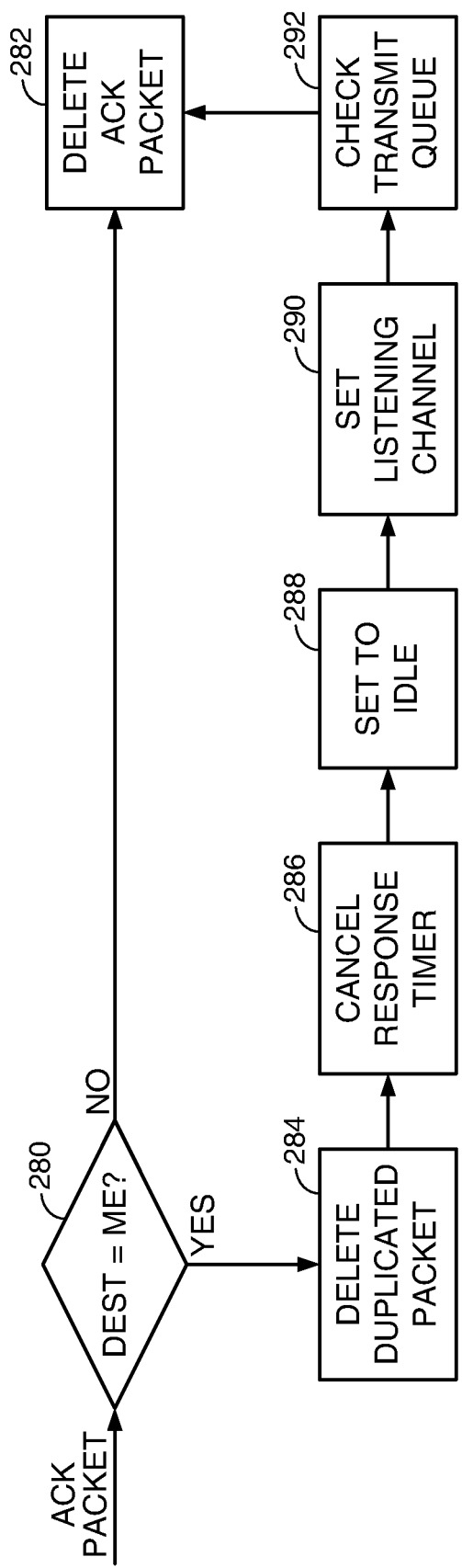

If the determination at act 254 was that the current packet is an ACK packet, the process proceeds to act 280, which is shown in FIG. 10. At act 280, a determination is made as to whether the destination for the ACK packet is the current node. If not, the process proceeds to act 282, at which point the currently-received ACK packet is deleted. If the destination is determined to be the current node, the process proceeds to act 284, at which point the previously duplicated packet in act 202 or in act 332 is deleted. In a next act 286, the response timer set in act 238 is cancelled. Subsequently, the schedule controller is set to idle in act 288, the listening channel is set in act 290, and the transmit queue is checked at 292. After act 292, the ACK packet is deleted at act 282.

Figure 11:
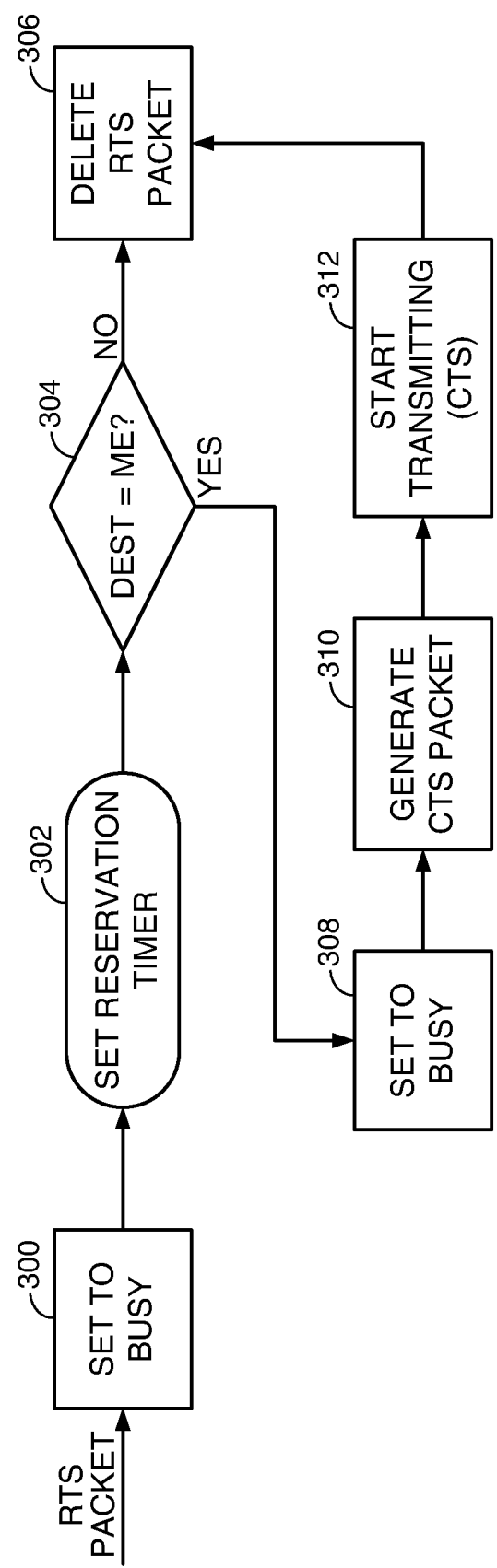

If, at act 256 a determination is made that the received packet is an RTS packet, the process proceeds to act 300, which is shown in FIG. 11. At act 300, the schedule controller is set to busy. Thereafter, at act 302, the reservation timer is set. Thereafter, at act 304, a determination is made as to whether the received RTS packet is destined for the current node. If not, the process proceeds to act 306, at which point the received RTS packet is deleted. If the RTS packet is destined for the current node, the process proceeds from act 304 to act 308, at which point the schedule controller is set to busy. Thereafter, at act 310, the CTS packet is generated. Thereafter, at act 312, the CTS transmission is commenced, after which the process proceeds to act 306, at which point the RTS packet is deleted.

Figure 12:
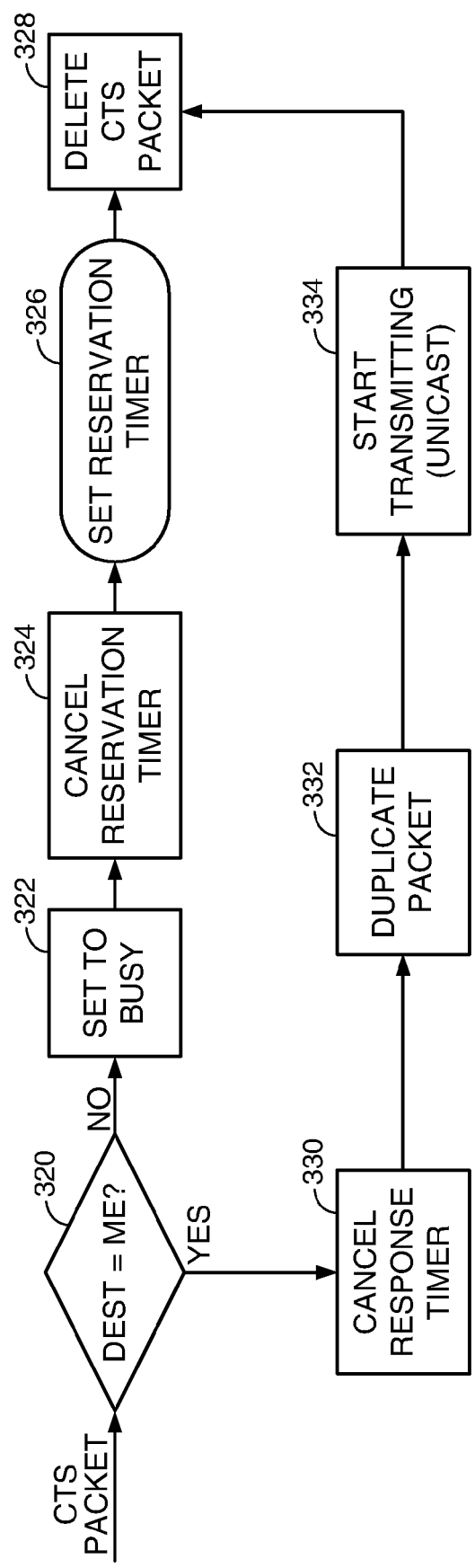

Referring back to FIG. 9, if, at act 258, the received packet is a CTS packet, the process proceeds from act 258 to act 320, which is shown in FIG. 12. At act 320, a determination is made as to whether the destination of the CTS packet is the current node. If not, the process proceeds to act 322, where the schedule controller is set to busy. Thereafter, the process proceeds to act 324, at which point the reservation timer set in act 302 is cancelled. Then, at act 326, the reservation timer is set, and in act 328, the CTS packet is deleted.

If a determination is made at act 320 that the destination for the CTS packet is the current node, the process proceeds to act 330, at which point the response timer set in act 216 is cancelled. Then in act 332, a duplicate packet is created. In act 334, the transmission of the unicast message is commenced. Then, the process proceeds to act 328, at which point the CTS packet is deleted.

Figure 13:
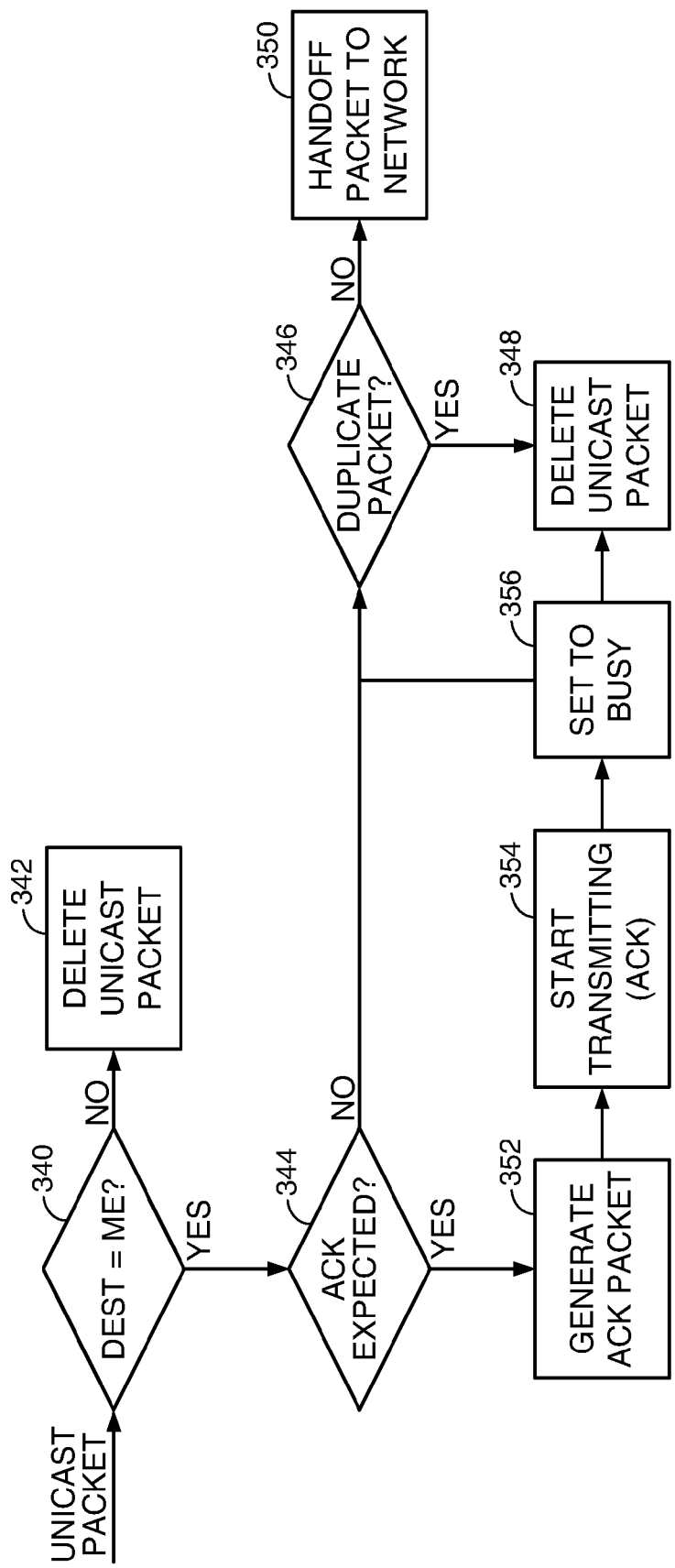

Referring again to FIG. 9, if a determination is made at act 260 that the received packet is a unicast packet, the process proceeds from act 260 to act 340, which is shown in FIG. 13.

At act 340, a determination is made as to whether the destination of the unicast packet is the current node. If not, the process proceeds to act 342, at which point the received unicast packet is deleted. If the unicast packet is destined for the current node, the process proceeds from act 340 to act 344, at which point a determination is made as to whether an ACK is expected. If not, the process proceeds to act 346, at which point a determination is made as to whether the received unicast packet is a duplicate packet. If so, the process proceeds to act 348, at which point the received unicast packet is deleted. If not, the duplicate packet is handed off to the network at act 350.

If a determination is made at act 344, that an ACK is to be expected, the process proceeds to act 352, where an ACK packet is generated. Then, in act 354, the ACK transmission is commenced. Thereafter, in act 356, the schedule controller is set to busy, and the process proceeds to act 346.

The illustrated node shown in FIG. 1 and the network shown in FIG. 2 may employ subnetting. This may occur at the IP layer. In this regard, nodes may be divided into subnets according to their IP subnet. All of the nodes in a given IP subnet may be statically assigned to the same set of channels. Router nodes may be provided with multiple interfaces, where each interface is assigned channels corresponding to a subnet. One of the channels assigned to a given subnet can be configured as the broadcast channel for that subnet.

Accordingly, nodes that wish to transmit will only be competing with nodes in the same subnet. Therefore, data exchanges within this common subnet occur concurrently with similar data exchanges in other subnets. Data exchanges between subnets may be passed through routers connecting the subnets to each other.

Each subnet may be assigned a unique broadcast channel. Accordingly, only the nodes in that subnet may share the common broadcast segment of the frame. In this way, the amount of frame time allocated to the broadcast traffic can be smaller, because it is serving fewer nodes. More time can accordingly be allocated to a unicast segment within the frame.

The available number of unicast and broadcast schedules per node can be larger per frame with this approach, since fewer nodes compete in the same frame. This method of partitioning can increase the effective number of opportunities a node has to transmit.

Another subnetting approach may involve making every channel available to every node in the network for unicast transmissions, while assigning unique channels to different group of nodes for broadcast transmissions.

In one or more of the embodiments described herein, predefined global schedules (for message start times (MSTs)) can be defined, for unicast transmissions and for broadcast transmissions. These schedules may be pseudorandom, based on an algorithm to provide fair channel access, and to avoid node starvation while bounding average expected latency. Such pseudorandom schedules may be mapped to unique nodes based on a unique node feature.

A simple hashing function may be employed to identify, from a set of unique node identifiers, corresponding sets of unique schedules. The following function may be used to randomly map 64-bit numbers into S distinct bins numbered 1 through S. A data encryption standard (DES) may be used as the heart of such a hashing function. The DES may be operated in an electronic code book (ECB) confidentiality mode. In this basic mode of a block cipher function such as the DES, the device is keyed with any one of its keying variables, $2^{56}$ in the case of the DES, and serves to produce a one-to-one mapping of its input words to its output words. In the present case of the DES, there are, conveniently, $2^{64}$ input and output words.

The example hashing function may be as follows:
A 64-byte unit address is entered into an input work register of a DES keyed with keying variable K, and the entered address is encrypted.
A 64-byte output word is composed of bits $b_1, b_2, \ldots, b_{64}$. The output word is converted to a number, N, $0 \leq N < 1$ by forming $$N = 2^{-1}b_1 + 2^{-2}b_2 + \ldots + 2^{-64}b_{64}.$$

N is now scaled to produce a uniformly distributed number, s, $1 \leq s \leq S$ by forming s=fix (NS)+1.

Changing a single bit in the input word will cause each output bit to be inverted with a probability of one half. Similarly, if a different keying variable is used, changing a single keying variable bit will cause each bit in the output word to be inverted with a probability of one half. It is possible to keep the keying variable secret in order to deny scheduling information to unauthorized parties.

If two nodes within range are mapped to the same schedule, this can be known during the discovery process, and one of the nodes may simply chose a different schedule. Thus, upon discovery, a node can determine both its own opportunities to receive or transmit messages and such opportunities of the other nodes.

A pseudorandom sequence of scheduled times is desired, in order to provide for a fair use of spectrum in different traffic conditions. For examples, packets can continue beyond the scheduled message start time and preclude subsequent nodes from receiving messages, in which case node starvation could occur. To prevent starvation, a pseudorandom technique could be utilized that moves message start times around within a frame that has the following features. Given a reference identifier, message start times in a given frame may be able to be determined in a computationally efficient manner. Sufficient randomness may be introduced such that nodes that potentially interfere with one another do no interfere over multiple consecutive frames.

One strategy for achieving this involves the following:
1. Select a prime number P and include a P−1 bins (schedule times) in a schedule set S.
2. At a given frame interval n, determine the schedule time within the following frame interval n+1 by multiplying the schedule time for a given schedule bin by a primitive route r in accordance with the following equation:

$$f(n+1) = [f_s(n)r] \bmod P.$$

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees, and others.

The invention claimed is:
1. Apparatus comprising:
a wireless transmit interface configured to transmit data wirelessly according to a plurality of automatically selectable frequency bands;
a wireless receive interface having a unique identifier and being configured to receive data wirelessly according to the plurality of automatically selectable frequency bands, the wireless receive interface being tuned to particular frequency bands, among the plurality of automatically selectable frequency bands, according to a pseudorandomized schedule that associates each of the particular frequency bands with a discrete message start time; and a controller to unilaterally determine a given that:
unilaterally selects a particular frequency band, from among the plurality of automatically selectable frequency bands, for a given data transfer, via wireless media, between a the apparatus as a first node and a similarly-configured apparatus as at least one separate second node, the unilateral selection of the particular frequency band being based identifying the unique identifier of the wireless receive interface in the similarly-configured apparatus as the at least one second separate node and a particular discrete message start time,
tunes the wireless transmit interface in the apparatus as the first node to the particular frequency associated with the particular discrete message start time according to the pseudorandomized schedule, and
directs transmission of the given data transfer from the first node to the at least one separate second node at the particular discrete message start time.

2. The apparatus according to claim 1, the first node being a wireless, non-access point, communication node.

3. The apparatus according to claim 1, each of the first node and the at least one separate second node further comprising a payload receive processor and a payload transmit processor in addition to the wireless transmit interface, the wireless receive interface, and the controller.

4. The apparatus according to claim 1, wherein at least of the wireless transmit interface includes a wireless radio transmit interface, and the wireless receive interface includes a wireless radio receive interface.

5. The apparatus according to claim 3, each of the payload receive processor and the payload transmit processor including payload processor circuitry to process payload data in accordance with a data structure protocol, the data structure protocol being a frame-based data structure protocol.

6. The apparatus according to claim 1, the given data transfer being a unicast data transfer from the first node to a single second separate node.

7. The apparatus according to claim 1, the given data transfer being a broadcast data transfer from the first node to a plurality of second separate nodes.

8. The apparatus according to claim 1, further comprising a storage device storing the pseudorandomized schedule in a lookup table including the particular frequency bands and associated particular discrete message start times,
the controller executing the unilateral selection of the particular frequency band by referencing data in the lookup table.

9. The apparatus according to claim 3, each of the payload receive processor and the payload transmit processor including payload processor circuitry to process payload data in accordance with a data structure protocol, the data structure protocol including a frame structure having a segment in a frame for broadcast data transfers and another segment within the same frame for unicast data transfers.

10. The apparatus according to claim 9, the controller being further configured to, during a broadcast segment of a frame, tune at least one of the nodes to a reference channel to receive a broadcast packet.

11. The apparatus according to claim 9, the controller being further configured to, during a unicast segment of a frame, tune at least one of the nodes to a unique receive channel in accordance with a globally known pseudorandomized schedule, the pseudorandomized schedule being known by all nodes in a communicating network.

12. A method comprising:
providing a wireless transmit interface configured to transmit data wirelessly according to a plurality of automatically selectable frequency bands in each of a plurality of nodes;
providing a wireless receive interface having a unique identifier and being configured to receive data wirelessly according to the plurality of automatically selectable frequency bands in each of the plurality of nodes, the wireless receive interface being tuned to particular frequency bands, among the plurality of automatically selectable frequency bands, according to a pseudorandomized schedule that associates each of the particular frequency bands with a discrete message start time;
unilaterally selecting, with a processor, a particular frequency band, from among the plurality of automatically selectable frequency bands, for a given data transfer, via wireless media, between a first node among the plurality of nodes and at least one separate second node among the plurality of nodes, the unilateral selection of the particular frequency band by the processor being based on identifying the unique identifier of the wireless receive interface in the at least one second separate node and a particular discrete message start time,
tuning, with the processor, the wireless transmit interface in the first node to the particular frequency associated with the particular discrete message start time according to the pseudorandomized schedule, and
directing, with the processor, the given data transfer from the first node to the at least one separate second node at the particular discrete message start time.

13. The method according to claim 12, the first node being a wireless, non-access point, communication node.

14. The method according to claim 12, each of the first node and the at least one separate second node further comprising a payload receive processor and a payload transmit processor in addition to the wireless transmit interface, the wireless receive interface, and the controller.

15. The method according to claim 14, each of the payload receive processor and the payload transmit processor including payload processor circuitry to process payload data in accordance with a data structure protocol, the data structure protocol being a frame-based data structure protocol.

16. The method according to claim 12, the given data transfer being a unicast data transfer from the first node to a single second separate node.

17. The method according to claim 12, the given data transfer being a broadcast data transfer from the first node to a plurality of second separate nodes.

18. The method according to claim 12, further comprising storing the pseudorandomized schedule in a lookup table including the particular frequency bands and associated particular discrete message start times; and
executing, with the processor, the unilateral selection of the particular frequency band by referencing data in the lookup table.

19. The method according to claim 14, each of the payload receive processor and the payload transmit processor including payload processor circuitry to process payload data in accordance with a data structure protocol, the data structure protocol including a frame structure having a segment in a frame for broadcast data transfers and another segment within the same frame for unicast data transfers,
the method further comprising, during a broadcast segment of a frame, tuning with the processor at least one of the nodes to a reference channel to receive a broadcast packet.

20. The method according to claim 14, each of the payload receive processor and the payload transmit processor including payload processor circuitry to process payload data in accordance with a data structure protocol, the data structure protocol including a frame structure having a segment in a frame for broadcast data transfers and another segment within the same frame for unicast data transfers, the method further comprising, during a unicast segment of a frame, tuning with the processor at least one of the nodes to a unique receive channel in accordance with a globally known pseudorandomized schedule, the pseudorandomized schedule being known by all nodes in a communicating network.

\* \* \* \* \*